No. 683,780. Patented Oct. 1, 1901.
R. MODJESKI.
CYCLOGRAPH.
(Application filed Sept. 17, 1900.)
(No Model.)

Witnesses:
Harold G. Barth
W. S. Cauright

Inventor:
Ralph Modjeski
By Geo. E. Waldo
Attys.

THE NORRIS PETERS CO., PHOTO-LITHO., WASHINGTON, D. C.

UNITED STATES PATENT OFFICE.

RALPH MODJESKI, OF CHICAGO, ILLINOIS.

CYCLOGRAPH.

SPECIFICATION forming part of Letters Patent No. 683,780, dated October 1, 1901.

Application filed September 17, 1900. Serial No. 30,243. (No model.)

*To all whom it may concern:*

Be it known that I, RALPH MODJESKI, a citizen of the United States, and a resident of Chicago, in the county of Cook and State of Illinois, have invented an Improved Cyclograph, of which the following is a specification.

This invention relates to cyclographs, and particularly to cyclographs of the general type heretofore patented to Thomas P. Worthington by Letters Patent of the United States No. 211,825, dated January 28, 1879, and comprising, essentially, wheels or disks of different diameters rigidly secured to a spindle or axle, preferably so as to be relatively adjustable longitudinally of said spindle or axle, and a marker or stylus-holder pivoted upon said spindle or axle.

Among the objects of the invention are to provide means to facilitate the setting of the instrument relatively to a known radius to effect register of the curve described thereby with the curve desired, to provide means to prevent the wheels or disks thereof from slipping, to provide a handle so located relatively to the spindle or axle of the instrument that a desired pressure may be exerted by the operator on both the wheels or disks and the stylus or marker, and generally to simplify the construction and at the same time increase the efficiency of the instrument.

To this end a cyclograph of my invention consists of the various features, combinations of features, and details of construction hereinafter described and claimed.

In the accompanying drawings a cyclograph of my invention is fully illustrated.

Figure 1:
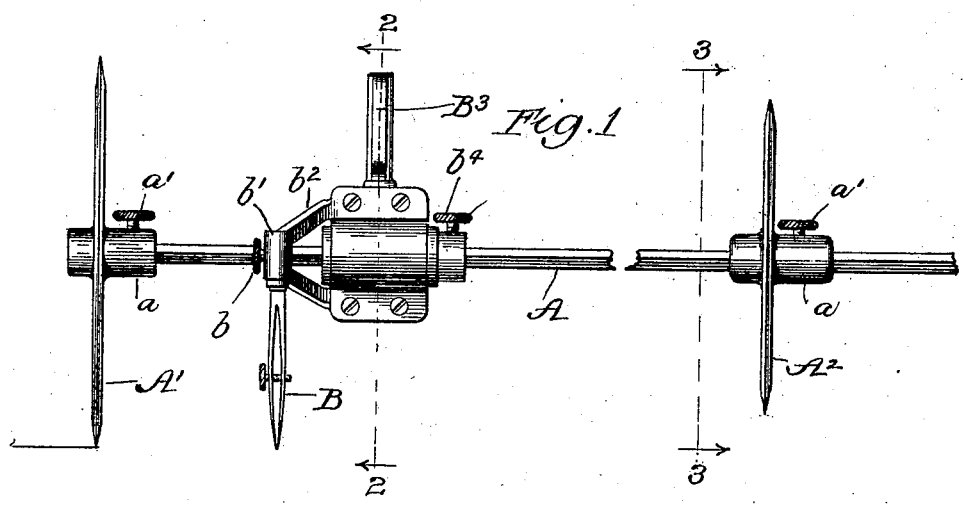
Figure 2:
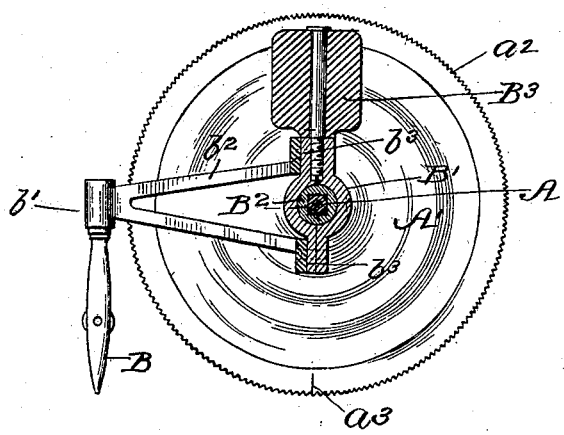
Figure 3:
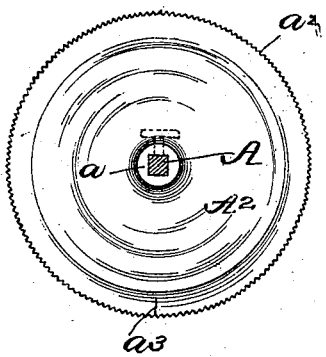
Figure 4:
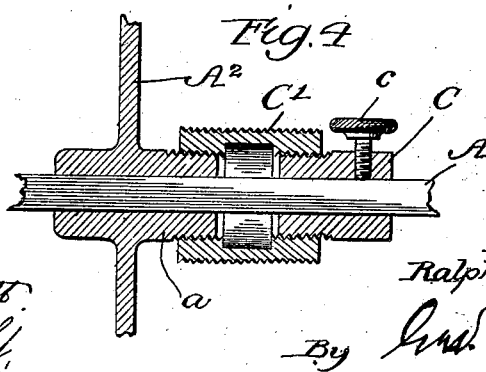

Figure 1 is a side view of a cyclograph of my invention. Figs. 2 and 3 are sectional elevations on the lines 2 2 and 3 3, respectively, of Fig. 1 looking in the directions indicated by the arrows; and Fig. 4 is a side view, partly in section, of a modified form of a cyclograph of my invention.

Referring now to the drawings, A designates the spindle or axle of the instrument, and $A'$ $A^2$ wheels or disks of different diameters secured thereto, preferably in such manner that they will be relatively adjustable longitudinally of said spindle, but will be in fixed angular adjustment thereon. As shown, the spindle A is square, and the wheels or disks $A'$ $A^2$ are provided with hubs $a$, in which are formed square holes adapted to receive said spindle or axle A. Set-screws $a'$, threaded through said hubs $a$ and adapted to bear on the spindle or axle A, afford convenient means for securing said wheels or disks $A'$ $A^2$ upon the spindle or axle A in desired longitudinal adjustment.

To prevent the wheels or disks $A'$ $A^2$ from slipping on the paper or other surface, teeth $a^2$ are formed in the edges of said wheels or disks. In the preferable construction shown the edges of the wheels $A'$ $A^2$ are beveled and the ends of the teeth $a^2$ are made sharp, thus insuring a desired engagement of said wheels with the paper or other surface on which the instrument is operating.

In order to facilitate setting the instrument to a given radius relative to which it is desired to describe an arc of a circle, marks $a^3$ are formed on the wheels or disks $A'$ $A^2$, being formed, preferably, on both faces thereof, in such positions that they will all be in the same plane passing through the axis of the spindle or axle A. Thus when one of the wheels or disks $A'$ $A^2$ is tangent to the paper or surface at the point $a^3$ the other will be also. Therefore all that is necessary to set the instrument to describe an arc of a circle corresponding to a given radius is to place the instrument so that the points $a^3$ on both wheels or disk $A'$ $A^2$ will be on said radius or radial line.

The marker B, either a pen, pencil, or other tracing-point, is secured by means of a set-screw $b$ in a suitable socket in a boss $b'$, secured to the ends of arms $b^2$, rigidly secured to ribs $b^3$, formed on a ring or sleeve B', mounted so as to rotate freely on a suitable bearing on the spindle A. In the preferable construction shown the bearing for the ring or sleeve B' is formed on a sleeve $B^2$, which is provided with a hole adapted to receive the spindle or axle A and which is adapted to be secured thereto by means of a set-screw $b^4$, thus making provision for adjusting said sleeve B and adjunctive parts, including the marker B, longitudinally of the spindle or axle A. In the preferable construction shown also the instrument is operated by means of a handle B³ on the ring or sleeve B', said handle being preferably located closely adjacent to the spindle A of the instrument. Preferably and as shown also the handle B³ is pivoted, thus eliminating the danger of swinging the instrument out of position by inadvertently twisting on the handle in operating the instrument.

A particular advantage of having the handle B³ applied to the spindle or axle in the manner described is that a desired pressure may thereby be exerted both upon the wheels or disks A' A² to effect a desired engagement of said wheels with the surface on which the instrument is operating and upon the marker B. It is thus rendered possible and practicable to dispense with the heavy weights heretofore used in instruments of this type to hold them in position.

In Fig. 4 of the drawings I have illustrated a modification of my improved cyclograph, which I will now describe. The object of said modification is to provide for a fine or micrometer adjustment of one or both of the wheels or disks A' A² in addition to the method of adjusting them on the spindle or axle A heretofore described. The means for this purpose are as follows, said means being shown as applied to the wheel or disk A² only: Fitted to the spindle or axle A so as to be freely movable longitudinally thereof is a sleeve or collar C, which is adapted to be secured to said spindle or axle in any desired longitudinal adjustment by means of a set-screw c. The adjacent ends of the sleeve or collar C and of the hub a on said wheel or disk A² are connected by means of a nut C', preferably threaded to both said sleeve or collar C and said hub a by threads of the same lead, but of different pitch—say twelve pitch on one and ten pitch on the other. As indicated, the exterior surface of the nut C is nurled. With this construction it is obvious that, having set the wheels or disks A' A² approximately relatively to each other any desired fineness of adjustment may be secured by means of the adjusting device just described. It is also obvious that while I have shown said adjusting device as applied only to the wheel or disk A² it may be applied equally well to the wheel or disk A' or to the bearing-sleeve B² of the marker-support.

I claim—

1. The combination in a cyclograph comprising a spindle and wheels or disks secured thereto so as to rotate therewith, of a marker-holder pivoted upon the spindle of the instrument, a marker secured in said marker-holder and a handle on said marker-holder applied thereto on the side of the marker toward the spindle of the instrument, substantially as described.

2. The combination in a cyclograph comprising a spindle and wheels or disks secured thereto so as to rotate therewith, of a marker-holder pivoted upon the spindle of the instrument, a marker secured in said marker-holder and a handle on said marker-holder applied thereto substantially directly over the spindle of the instrument, substantially as described.

3. The combination in a cyclograph comprising a spindle and wheels or disks secured thereto so as to rotate therewith of means to adjust one of said wheels or disks longitudinally of the spindle, said means comprising a sleeve or collar adapted to be secured to the spindle in fixed longitudinal adjustment and a nut threaded to said sleeve and to the hub of said wheel or disk, substantially as described.

4. The combination in a cyclograph comprising a spindle and wheels or disks secured thereto so as to rotate therewith of means to adjust one of said wheels or disks longitudinally of the spindle, said means comprising a sleeve or collar adapted to be secured to the spindle of the instrument in fixed longitudinal adjustment and a nut threaded to said sleeve or collar and to the hub of said wheel or disk, the threads on said sleeve or collar and on the hub of said wheel or disk being of the same lead but different pitch, substantially as described.

In testimony that I claim the foregoing as my invention I have hereunto set my hand this 14th day of September, 1900.

RALPH MODJESKI.

Witnesses:
 CALVIN SPORLING,
 BYRON B. CARTER.